July 28, 1959 P. C. JACOBS 2,896,947
CAPTIVE PASSENGER CARRYING POWERED AIRCRAFT
Filed Feb. 4, 1957 3 Sheets-Sheet 1

INVENTOR
PETER CHARLES JACOBS

ATTORNEY

July 28, 1959 — P. C. JACOBS — 2,896,947
CAPTIVE PASSENGER CARRYING POWERED AIRCRAFT
Filed Feb. 4, 1957 — 3 Sheets-Sheet 2

INVENTOR
PETER CHARLES JACOBS
Edward Eversley Bishop
ATTORNEY

INVENTOR
PETER CHARLES JACOBS

ATTORNEY

United States Patent Office 2,896,947
Patented July 28, 1959

2,896,947
CAPTIVE PASSENGER CARRYING POWERED AIRCRAFT

Peter Charles Jacobs, Edmonton, Alberta, Canada

Application February 4, 1957, Serial No. 638,104

2 Claims. (Cl. 272—34)

This invention is related generally to aerial amusement rides and particularly to a captive powered aircraft that may be passenger operated for amusement or training purposes.

It is an object of my invention to provide a captive aircraft in which a passenger will experience a sensation closely similar to actual free flight.

A further object is to provide a captive aircraft having controls similar to a conventional aircraft that may be manipulated by a passenger to manoeuvre the craft to closely simulate actual free flight.

A further object is to provide a captive aircraft whose ascent and descent is made possible by a rotating propeller controlled by a passenger in the craft.

A still further object is to provide a captive aircraft, an integral part of whose supporting structure is counterweighted.

An additional object is to provide a passenger carrying captive aircraft whose supporting structure is provided with shock absorbing means.

A still further object is to provide a passenger carrying captive aircraft that may be used for training purposes to reduce the training time required in helicopter-type aircraft.

Further objects and advantages of this invention will be apparent from the specification when read in conjunction with the attached drawings. It should be understood that the specification and drawings describe only one example and illustration and numerous changes in the details of construction and the combination and arrangement of parts may be resorted to without departing from the spirit and scope of the invention as set out in the claims.

Figure 1:
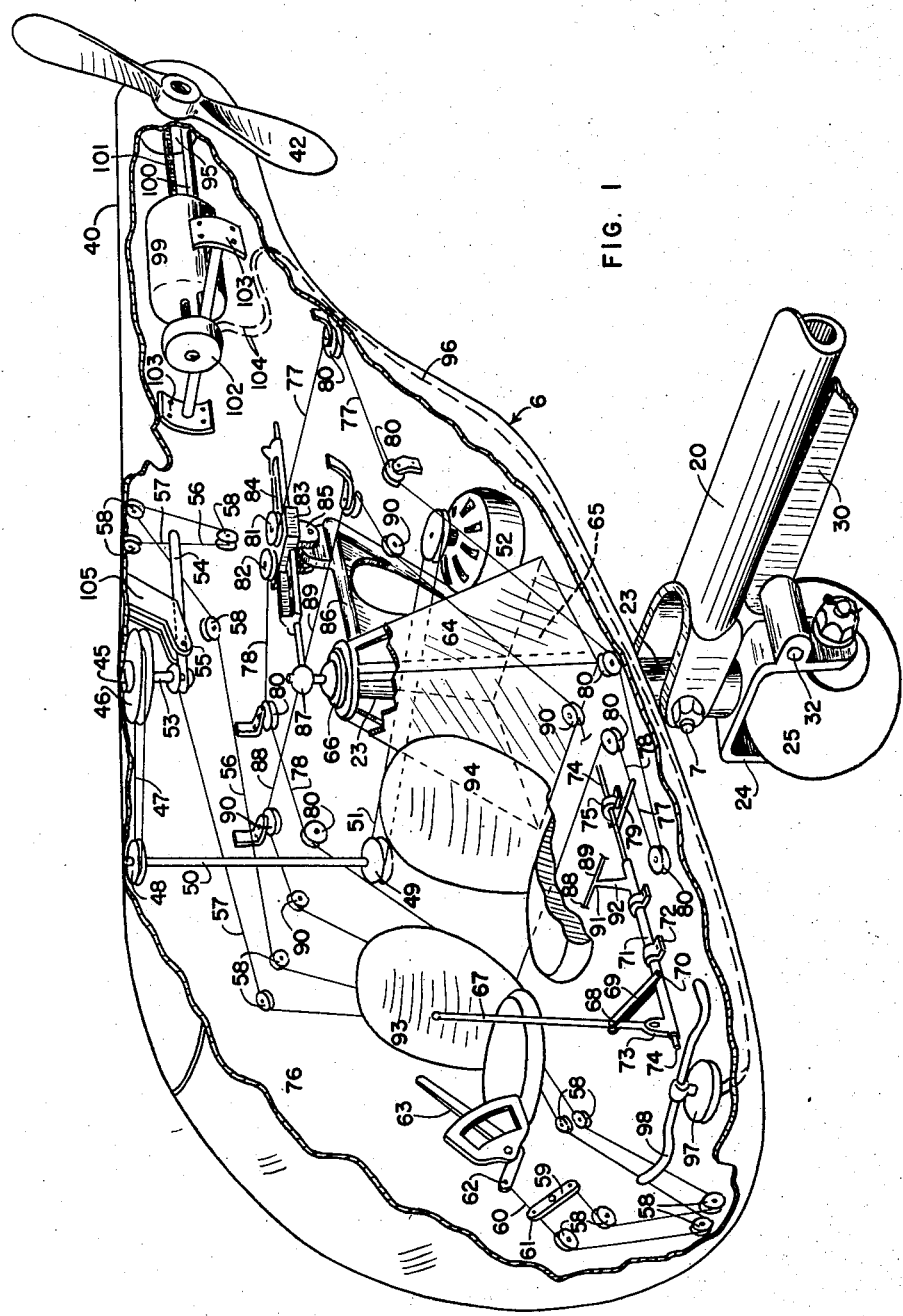
Figure 1 is an enlarged broken section of my passenger carrying aircraft illustrating the placement of the aircraft controls and the operating mechanism.

The supporting structure for my device includes the pylon designated generally by the numeral 1, with the boom designated generally by the numeral 2 attached part way along its length to the pylon. It should be noted that one end 4 of the boom is on one side of the pylon and the opposite end 8 of the boom is on the other side of the pylon with the aircraft 6 attached rotatably at 7 to the end 8, and that the portion of the boom 2 on the one side of the pylon and terminating in the end 8 is of considerably greater length than the portion of the boom terminating in the end 4.

The pylon 1, of sufficiently rigid construction to provide adequate support for the boom 2 and aircraft 6, is constructed with a lower section 9 and upper section 10 mounted rotatably thereon. The upper section 10 includes the yoke having upstanding spaced arms 12—12 with the transverse axle 13 extending laterally through the upstanding arms 12—12 and the sleeve 3 attached rotatably to the axle 13 as well as the gussets 14—14 provided for stiffening purposes at this point of attachment. Adequate rigidity to the boom 2 is provided by the longitudinal struts 15 and additional gussets 17 at strategic points. The shock absorbers 18—18 coacting between the boom 2 and the upper end 10 of the pylon provide a cushioning effect at the limits of vertical movement of the boom with respect to the pylon and will prevent the aircraft 6 from descending and striking the ground with sufficient force to injure the passengers in the craft.

Figure 2:
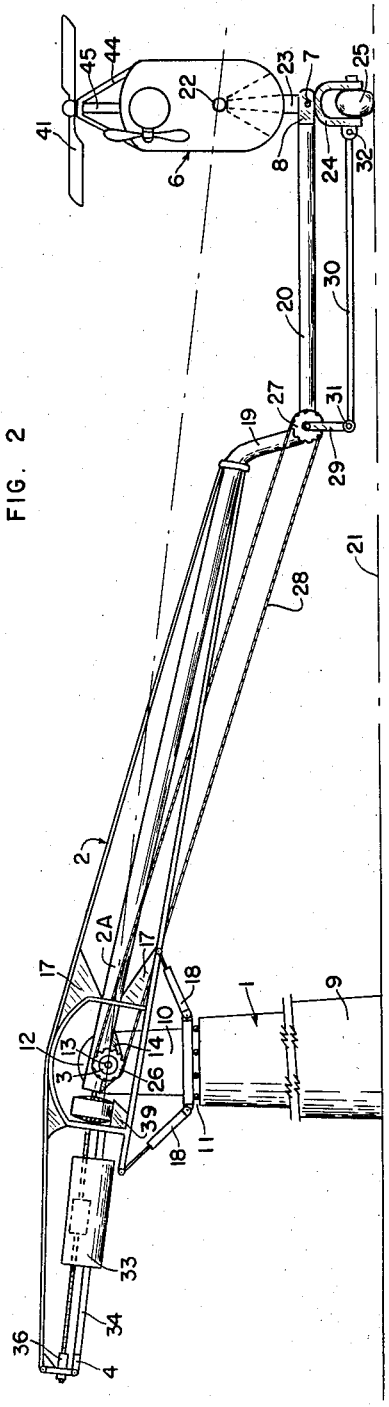
Figure 2 is a view in elevation of my aircraft, its supporting arm and pylon.
Figure 3:
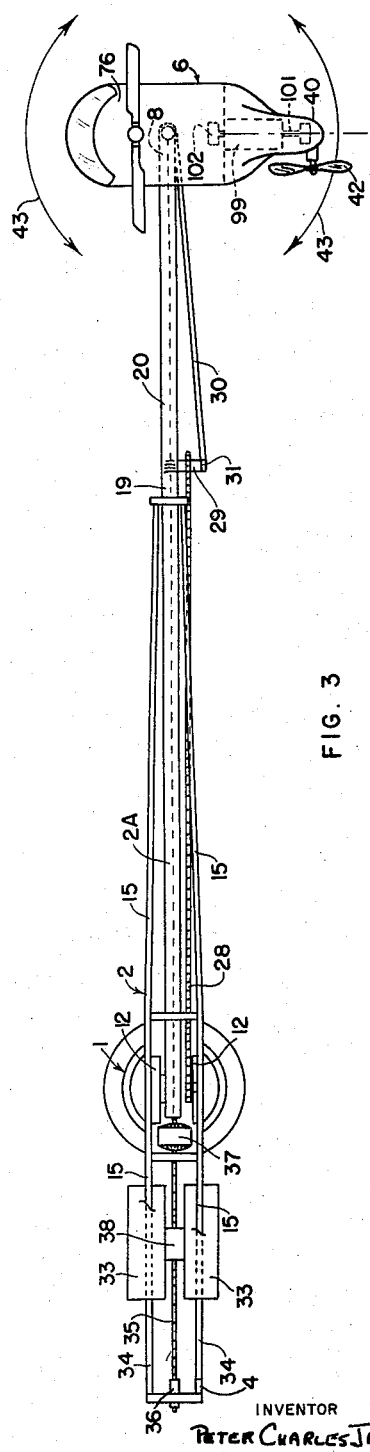
Figure 3 is a plan view projected on Figure 2.
Figure 4:
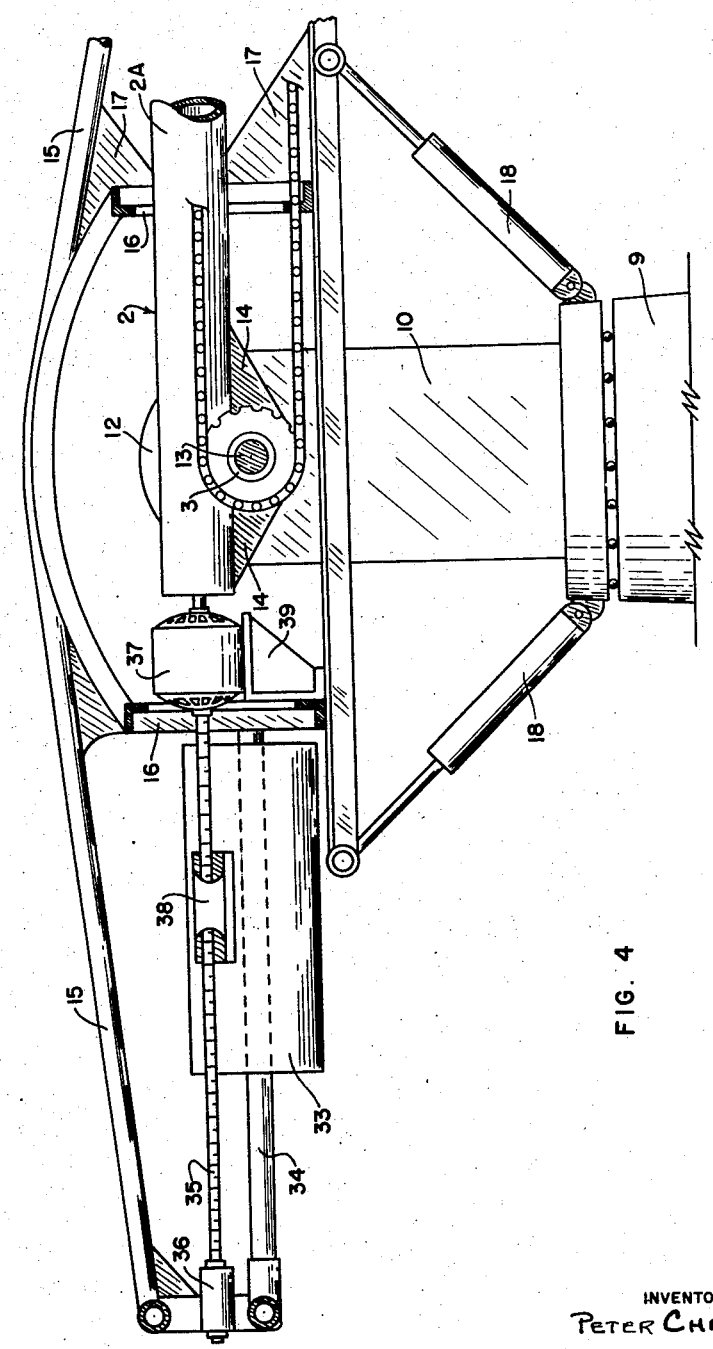
Figure 4 is an enlarged detail view illustrating the connection of the boom to the pylon.

As is seen in Figure 2 in the drawings, the boom 2 is provided with a stepped-down portion 19 and is extended to allow the portion 20 to be horizontal to the ground surface 21 when the boom is in the lowered position.

The vertical support 23 is mounted rotatably at 7 to the end 8 of the boom and is formed at its lower end below the boom into the yoke 24 with the supporting wheel 25 mounted rotatably in the yoke. The vertical support 23 is maintained in a vertical position at all times regardless of the position of the boom by the link 30 which is connected rotatably at one end 32 to the yoke 24 and at the opposite end 31 is connected rotatably to the crank 29. The crank 29 is fixed to the sprocket wheel 27 which is linked through the sprocket chain and cable 28 to the sprocket wheel 26 fixed to the axle 13. While I have shown this mechanism for maintaining the vertical support 23 in a vertical position at all times regardless of boom movement, it will be obvious that other mechanical arrangements could be used to achieve the same purpose.

The boom is counter-balanced by the counterweight 33 which is mounted slidably on the rod 34 and is engaged threadably with the feed screw 35 so that rotation of the feed screw will move the counterweight backwardly and forwardly on the rod. The feed screw 35 is connected to the motor 37 which is secured rigidly on the bracket 39 on the boom 2. Suitable electrical connections to the motor 37 would be carried down the center of the boom 2 to a reversing switch or other controlling apparatus situated adjacent to the resting point of the aircraft 6.

The aircraft fuselage 6 is pivotally mounted in socket 66 on the ball 22 on the upper end of the vertical support 23. The aircraft fuselage 6 would be constructed preferably in more or less standard shape, there being provided an enlarged body portion 76 designed to accommodate one or more passengers and a reduced tail portion 40. Ascent and descent of the aircraft is accomplished through the horizontally operating variable pitch propeller 41 above the aircraft. The propeller 41 is supported by the framework 44 and is operated through the shaft 45 which extends into the fuselage 6 and terminates in the pulley 46. The pulley 46 is interconnected through the belt 47, pulleys 48 and 49 on the shaft 50 and the belt 51 to the motor 52. The motor 52 drives the propeller at a constant speed and the variable pitch of the propeller is controlled through the variable pitch shaft 53 operating slidably in the shaft 45 and actuated through movement of the lever 54, mounted axially at 55 in the bracket 105. The lever 54 is actuated through the cables 56 and 57 operating through the pulleys 58 and connected to the rocker arm 59 which is actuated through the link 60 pivotally connected at 61 to the rocker arm 59 and at 62 to the pitch control lever 63.

Pivotal mounting of the aircraft fuselage 6 on the vertical support 23 is accomplished through the truncated supporting structure 64 terminating at the socket 66 fixed over the opening 65 in the fuselage 6. The vertical support 23 projects through the opening 65 and is mounted pivotally at 66 at the top of the framework 64. It will be obvious that mounting in this manner allows unrestricted movement of the fuselage 6 throughout a plurality of aerobatic positions within the limits of the opening 65 in the aircraft fuselage.

Rotation (through 30°) around the lateral axis of the fuselage 6 to obtain a forward or reverse flight is accomplished through backward and forward movement of the control stick 67. The control stick 67 is axially connected at 68 to the link 69 which is fixed at 70 to the tube 71, and the rotational tube 71 is secured in the bearings 72, which are fixed to the fuselage 6. At its lower end, the stick 67 is axially connected within elongated slots in the ears 73 to the rod 74 and it will be obvious that backward or forward movement of the stick 67 will move the rod 74 backward or forward in the tube 71. During its backward and forward movement, the rod 74 is supported in a further bearing 75 fixed to the fuselage 6 and is attached to the cables 77 and 78 through the arm 79 projecting laterally from the bar 74. The cables 77 and 78, similar to the cables 56 and 57, are guided through pulleys 80 and from the pulleys 80 connected to the rotatable actuating pulleys 81 and 82 which are mounted on the yoke bar 83. The yoke 83 is fitted to support the sliding rods 84 and hinged at 85 to the bracket 86 on the supporting structure 64. The bars 84 are connected to the ball and socket joint 87, the ball of which is directly connected to the supporting ball 22 in the socket 66, whereby moving the stick 67 in a backward or forward direction will pull on either cable 77 or 78 to rotate either the pulleys 81 or 82 to move the rods 84 in the yoke 83 and depress or raise the nose of the fuselage 6.

Rotation (through 30°) of the aircraft fuselage 6 around the longitudinal axis is controlled through the cables 88 and 89 which are fixed to the opposite sides of the ball and socket joint 87 and are guided through pulleys 90 to connect at 91 to the arm 92 fixed rigidly to the sleeve 71. It will be immediately obvious that any sideways movement of the stick 67 will rotate the sleeve 71 to move the arm 92 and exert pull on either the cables 88 and 89 to partially rotate the fuselage 6 on the ball 22 simulating side drift in a helicopter. The control stick 67 would be mounted within the fuselage 6 immediately ahead of one of the seats 93 or 94 so that one passenger would have direct control of the fuselage movement at all times.

Rotation (through 360°) of the aircraft fuselage around the vertical axis, is provided by the vertically operating propeller 42 which is powered by the motor 95 in the tail of the fuselage 6. The motor 95 would be connected electrically through the cables 96 to the rheostat 97 which is rotated by movement of the foot bar 98. Obviously movement of the foot bar 98 would alter the setting of the rheostat 97 to increase or decrease the rotation speed of the propeller 42 and move the aircraft fuselage 6 about the ball and socket pivot joint 66. Movement of the aircraft fuselage 6 in the opposite direction is automatic owing to the constant torque of the rotating propeller 41.

To provide a weight adjustment at the tail of the fuselage 6 to compensate for the weight of the passengers in the seats 93 or 94 I have provided the counterweight 99 to slide along the guide bar 100 and be actuated by rotation of the threaded feed screw 101. The feed screw 101 is rotated by the motor 102 bracketed at 103 to the fuselage 6 and connected to a suitable source of electric power by the cables 104. In my preferred embodiment I would calculate and construct the feed screws 101 and 35 simultaneously and proportionately move the counterweights 99 and 33 to compensate for varying passenger weights in relation to boom and fuselage balance. I will provide that the electrical connection 104, to the motor 102 and the electrical connections to the motor 37 will be connected to the same electric control so that the weights can be moved simultaneously to their correct positions. Obviously, when the aircraft fuselage 6 is at its idle or non-operating position, the weights 99 and 33 would be moved to their minimum counterweight position so the fuselage 6 would remain stationary.

It is considered that the electrical connections to the motors 37, 52, 99 and 102 from the source of electrical power and to the controlling switches for the motors would be a matter of ordinary mechanical skill although it is suggested that separate switches to control each motor would be included in the fuselage switch with master switches for each of the motor circuits situated at the ground loading point and operable by a ground attendant in the event of emergency to control or shut off any of the motors, if necessary. Since these electrical connections are of a simple nature employing standard components and circuitry, it is not considered necessary to illustrate or describe a precise electrical circuit or circuit connections.

The embodiments of the invention in which an exclusive property or privilege is claimed are defined as follows:

1. In a captive passenger carrying powered aircraft having a pylon with an arm attached at a point along its length to the pylon for rotational and vertical movement with respect to the pylon and an adjustable counterweight at one end of the arm, a passenger carrying powered aircraft mounted pivotally at the opposite end of the arm for universal movement with respect to the said pivotal mounting, controls within the aircraft reactable between the aircraft and the arm to move the aircraft universally with respect to the pivotal mounting, a lifting propeller mounted above the aircraft to operate in a fixed horizontal plane with respect to the aircraft and a propeller mounted on the aircraft to operate in a fixed vertical plane with respect to the aircraft to rotate the aircraft about the said pivotal mounting.

2. In a captive passenger carrying powered aircraft having a pylon with an arm attached at a point along its length to the pylon for rotational and vertical movement with respect to the pylon and an adjustable counterweight at one end of the arm, a support mounted rotatably at one end to the opposite end of the said arm, means reacting between the said support and the said arm to maintain the support parallel to the said pylon throughout vertical movement of the arm, a passenger carrying powered aircraft mounted pivotally on the opposite end of the support for universal movement about the pivotal mounting and controls within the aircraft reactable between the aircraft and the pivotal mounting to move the aircraft universally with respect to the mounting.

References Cited in the file of this patent

UNITED STATES PATENTS

| | | |
|---|---|---|
| 1,235,506 | Strauss | July 31, 1917 |
| 1,996,923 | Jacobsen | Apr. 9, 1935 |
| 2,282,763 | Kennedy | May 12, 1942 |

FOREIGN PATENTS

| | | |
|---|---|---|
| 695,062 | Great Britain | Aug. 5, 1953 |